United States Patent
Ito et al.

(10) Patent No.: US 8,606,446 B2
(45) Date of Patent: Dec. 10, 2013

(54) CONTROL SYSTEM OF HYBRID VEHICLE

(75) Inventors: Takao Ito, Yokohama (JP); Yoshiyuki Ootake, Yokohama (JP); Masaki Koga, Yokohama (JP); Tetsuya Iwasaki, Tokyo (JP); Takashi Ogino, Yokohama (JP); Yasuhiro Konishi, Atsugi (JP); Tomoyuki Koike, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 405 days.

(21) Appl. No.: 13/034,072

(22) Filed: Feb. 24, 2011

(65) Prior Publication Data
US 2011/0213521 A1 Sep. 1, 2011

(30) Foreign Application Priority Data

Feb. 26, 2010 (JP) ................................. 2010-041289

(51) Int. Cl.
*B60W 10/30* (2006.01)
(52) U.S. Cl.
USPC ....................................... 701/22; 180/65.265
(58) Field of Classification Search
USPC ......... 701/22, 54; 180/65.265, 65.27, 65.235, 180/65.28, 65.29, 65.285; 909/903, 930, 909/910, 917, 919, 905, 945, 918; 307/10.6; 290/40 C, 40 R; 477/107
See application file for complete search history.

(56) References Cited

U.S. PATENT DOCUMENTS

| | | | | |
|---|---|---|---|---|
| 6,335,573 | B1 * | 1/2002 | Eguchi et al. | 290/40 C |
| 7,000,718 | B2 * | 2/2006 | Adachi et al. | 180/65.235 |
| 8,245,684 | B2 | 8/2012 | Reynolds et al. | |
| 2008/0234915 | A1 * | 9/2008 | Nomasa et al. | 701/102 |
| 2010/0284823 | A1 | 11/2010 | Reynolds et al. | |
| 2010/0288570 | A1 * | 11/2010 | Tarnowsky et al. | 180/65.265 |

FOREIGN PATENT DOCUMENTS

| | | |
|---|---|---|
| CN | 101881213 A | 11/2010 |
| CN | 101890902 A | 11/2010 |
| JP | 2006-145043 A | 6/2006 |
| JP | 2007-216764 A | 8/2007 |

* cited by examiner

*Primary Examiner* — Marthe Marc-Coleman
(74) *Attorney, Agent, or Firm* — Foley & Lardner LLP

(57) ABSTRACT

A control system of a hybrid vehicle, includes: an engine; a motor capable of driving the engine; an oil pump for supplying a lubricant oil to a lubrication requiring portion of the engine; and an engine lubrication controller configured to make the following operations in a case that a stop state of the engine continues for more than or equal to a certain period: when a vehicle stop condition that a driver has no intention of travel is established, supplying, by the oil pump, the lubricant oil to the lubrication requiring portion of the engine, and rotating the engine by the motor without igniting the engine, thereby implementing an engine lubrication control.

13 Claims, 4 Drawing Sheets

Motoring stop condition

CONTROL SYSTEM OF HYBRID VEHICLE

BACKGROUND OF THE INVENTION

1. Field of the Invention

The present invention relates to a control system of a hybrid vehicle where an engine and a motor capable of driving the engine is installed.

2. Description of the Related Art

As shown in Japanese Patent Application Laid-Open No. 2007-216764, a conventional hybrid vehicle equipped with a control system is known where the control system implements the following operations when a stop period of an engine goes beyond a certain period with an ignition key turned on (otherwise referred to as "key-on state"): without starting the engine, a cranking for rotating the engine by a motor drives a pump which circulates a lubricant oil in the engine.

With respect to the conventional hybrid vehicle, however, when an oil lubrication requirement that the engine stop state has continued for more than or equal to the certain period is established in the ignition key-on state, cranking of the engine is implemented by the motor and the pump is driven, to thereby implement the engine lubrication control. With this, at a "travel mode" in the key-on state, a power consumption by the motor is caused due to the engine lubrication control, thus decreasing a battery capacity in the travel by an amount equivalent to the power consumption. As a result, at a vehicle system start shifting from a key-off state to the key-on state, that is, at a time point of initially riding on the hybrid vehicle, a motor travel distance recognized by the battery remaining capacity is shortened by the engine lubrication control which has nothing to do with the travel.

SUMMARY OF THE INVENTION

It is an object of the invention to provide a control system of a hybrid vehicle which control system is capable of preventing a motor travel distance (recognized at a time point of initially riding on the hybrid vehicle) from being shortened by an engine lubrication control which has nothing to do with the travel.

According to an aspect of the present invention, there is provided a control system of a hybrid vehicle, comprising: an engine; a motor capable of driving the engine; an oil pump for supplying a lubricant oil to a lubrication requiring portion of the engine; and an engine lubrication controller configured to make the following operations in a case that a stop state of the engine continues for more than or equal to a certain period: when a vehicle stop condition that a driver has no intention of travel is established, supplying, by the oil pump, the lubricant oil to the lubrication requiring portion of the engine, and rotating the engine by the motor without igniting the engine, thereby implementing an engine lubrication control.

Other objects and features of the present invention will become understood from the following description with reference to the accompanying drawings.

DESCRIPTION OF THE PREFERRED EMBODIMENTS

Figure 1:
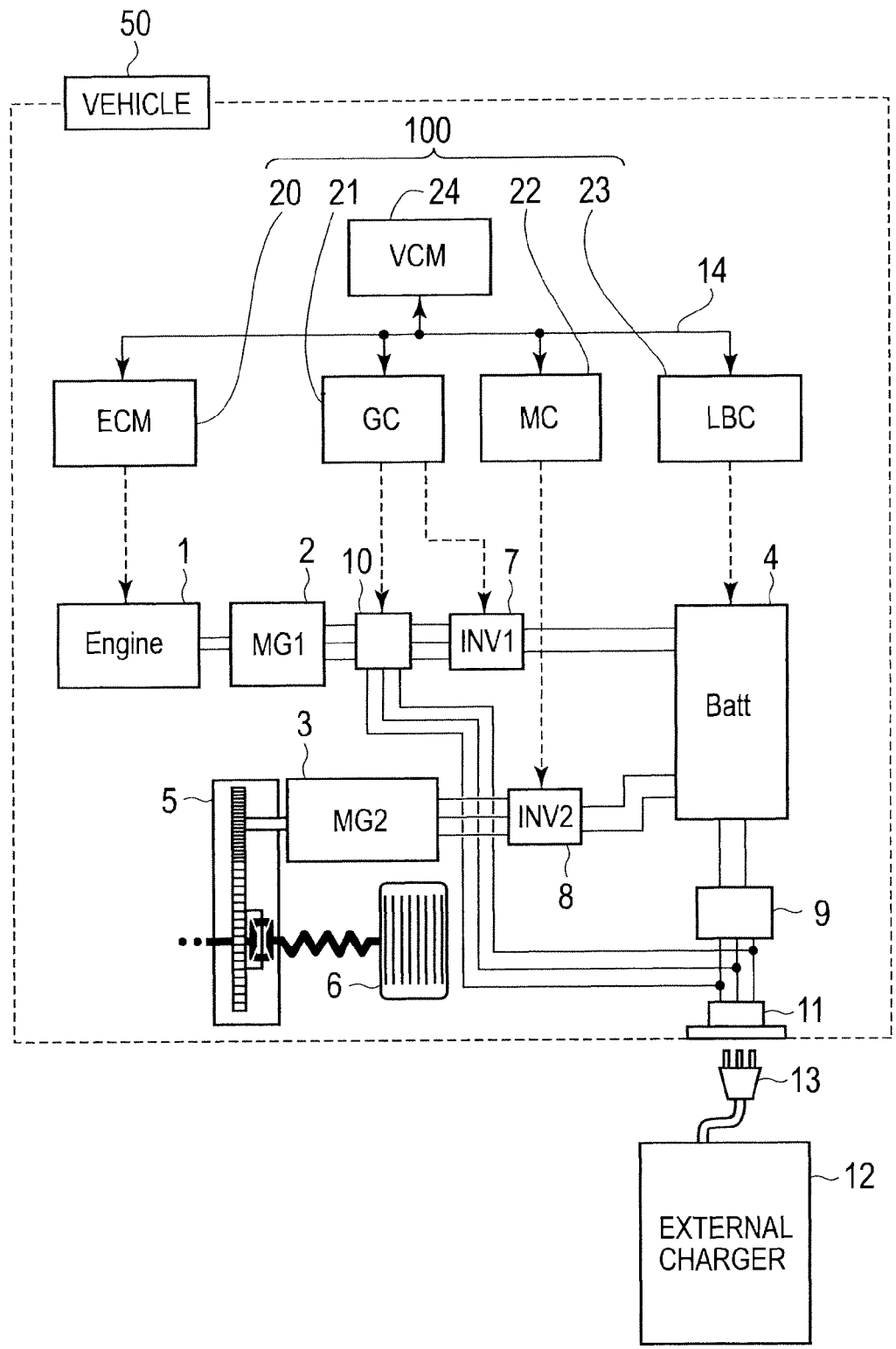
FIG. 1 is an entire system drawing showing a series type plug-in hybrid vehicle to which a control system is applied according to an embodiment 1 of the present invention.

Hereinafter, referring to the drawings, the best mode for accomplishing a control system of a hybrid vehicle is to be set forth, according to the embodiment 1 of the present invention.

Embodiment 1

At first, a structure is to be set forth.

FIG. 1 is an entire system drawing showing a series type plug-in hybrid vehicle 50 (an example of a hybrid vehicle) to which a control system 100 is applied, according to an embodiment 1 of the present invention.

A drive system of the plug-in hybrid vehicle 50 according to the embodiment 1 is, as shown in FIG. 1, provided with an engine 1, a generation motor 2 (motor), a drive motor 3, a high power battery 4, a deceleration differential mechanism 5, a drive wheel 6, a generation motor inverter 7, a drive motor inverter 8, a charge converter 9, a switch 10 and a charge port 11.

The drive system of the embodiment 1 is of a series type (series method) where the engine 1 drives the generation motor 2, a generated power is stored in the high power battery 4, the power drives the drive motor 3 and the plug-in hybrid vehicle 50 travels with only the drive motor 3 as a driving source. In short, the plug-in hybrid vehicle 50 according to the embodiment 1 is "an electric vehicle (hereinafter denoted by "EV") incorporating therein a generation system" and has an EV travel mode as its only travel mode.

When an electric generation is required, the generation motor 2 directly connected to the engine 1 starts the engine 1. After a complete explosion, a power from the engine 1 drives the generation motor 2, to thereby make an electric generation. Then, in a transition from "generation required" to "generation not required," the engine 1 and the generation motor 2 are stopped.

The generation motor 2 is a motor generator which is directly connected to the engine 1 and shows a motor function as well as a generation function. The motor function is shown in the following occasion: when the generation is required in an engine stop state, the generation motor 2 consumes the power of the high power battery 4 and implements the engine start by ignition after cranking of the engine 1. The generation function is shown in the following occasion: when the engine 1 is in a drive state, the generation motor 2 receives a rotary drive power from the engine 1, then converts the rotary drive power into a 3-phase alternating current power, and then charges the high power battery 4 with the generated power.

The drive motor 3 is a motor generator which is connected to a drive wheel 6 of the vehicle 50 by way of the deceleration differential mechanism 5 and shows the motor function and generation function. The motor function is shown in the following occasion: the drive motor 3 consumes the power of the high power battery 4 at a start acceleration, a constant speed travel or an intermediate acceleration so as to drive the vehicle

50. The generation function is shown in the following occasion: in a deceleration, a braking operation and the like, the drive motor 3 receives the rotary drive power from the drive wheel 6, then converts the rotary drive power into a 3-phase alternating power, and then implements a regeneration of charging the high power battery 4 with the generated power.

As the high power battery 4, a lithium ion secondary battery, a high capacity battery or the like is used. The high power battery 4 stores the power generated by the generation motor 2 or the power regenerated by the drive motor 3. Moreover, the high power battery 4 supplies the stored power to the drive motor 3 or generation motor 2.

The generation motor inverter 7 is disposed between the generation motor 2 and the high power battery 4, and mutually converts the 3-phase alternating current and the direct current. The 3-phase alternating current is used for the driving and generation of the generation motor 2 while the direct current is used for the charge and discharge of the high power battery 4.

The drive motor inverter 8 is disposed between the drive motor 3 and the high power battery 4, and mutually converts the 3-phase alternating current and the direct current. The 3-phase alternating current is used for the driving and generation of the drive motor 3 while the direct current is used for the charge and discharge of the high power battery 4.

The charge converter 9 is disposed between the high power battery 4 and the charge port 11. During a plug-in loading, the charge converter 9 converts an external alternating current power (supplied from the charge port 11) into a direct current power chargeable to the high power battery 4.

A switch 10 is disposed between the generation motor 2, the generation motor inverter 7 and the charge port 11 and makes a switching operation between a generation path and an electricity supply path. The generation path is a pattern which separates the charge port 11 and connects the generation motor 2 with the generation motor inverter 7. The electricity supply path is a pattern which selects any of the following three patterns:

1) a first pattern which separates the charge port 11 and connects the generation motor 2 with the generation motor inverter 7, to thereby use the power of the high power battery 4.

2) a second pattern which makes a connection between the generation motor 2, the generation motor inverter 7 and the charge port 11, to thereby use both the power of the charge port 11 and the power of the high power battery 4.

3) a third pattern which separates the generation motor inverter 7 and connects the generation motor 2 with the charge port 11, to thereby use the power of the charge port 11.

The charge port 11 is disposed in a position at an outer periphery of a body of the vehicle 50. When the vehicle 50 stops in a set position of an external charger 12 and a lid and the like is opened to thereby insert a power supply plug 13 of the external charger 12 into the charge port 11 and connect the power supply plug 13 to the charge port 11, the high power battery 4 is charged with an electricity via the charge converter 9 (plug-in charge). Herein, examples of the external charger 12 include a home-use charge system for making a low speed charge by using a night-time power at home, a rapid charge station capable of rapidly making an electric charge at a place far from home, and the like.

The control system of the plug-in hybrid vehicle 50 according to the embodiment 1 has, as shown in FIG. 1, an engine controller 20 (ECM), a generator controller 21 (GC), a motor controller 22 (MC), a battery controller 23 (LBC) and a vehicle synthetic controller 24 (VCM). The engine controller 20, the generator controller 21, the motor controller 22, the battery controller 23 and the vehicle synthetic controller 24 are connected together by means of a CAN communication line 14 capable of making information changes such that various data can be shared.

At an "EV travel mode" in a key-on state, according to a control instruction from the vehicle synthetic controller 24, the engine controller 20 operates the intake air quantity, ignition timing and fuel injection quantity of the engine 1 to thereby control an output torque.

At the "EV travel mode" in the key-on state, according to the control instruction from the vehicle synthetic controller 24, the generator controller 21 operates the generation motor inverter 7 so as to control an input-output torque of the generation motor 2.

The generator controller 21 continues the operation even when the ignition key is turned off (system off state). The generator controller 21 measures the continuation period of the engine stop state in both the key-on state and key-off state. Based on the measurement information of the engine stop continuation period and based on other input information, the generator controller 21 determines whether or not the engine lubrication control start condition is established. Then, when the engine lubrication control start condition is established, the generator controller 21 implements a generation system start process for starting other necessary controllers, to thereafter implement the engine lubrication control.

At the "EV travel mode" in the key-on state, according to the control instruction from the vehicle synthetic controller 24, the motor controller 22 operates the drive motor inverter 8 so as to control an input-output torque of the drive motor 3.

At the "EV travel mode" in the key-on state, the battery controller 23 estimates internal state quantities such as charge ratio (charge capacity) of the high power battery 4, an inputable-outputable power of the high power battery 4 and the like and implements a control of protecting the high power battery 4. Hereinafter, the charge ratio of the high power battery 4 (charge capacity) is referred to as battery SOC (State Of Charge).

At the "EV travel mode" in the key-on state, based on the various shared data, the vehicle synthetic controller 24 controls a motor drive output according to a driver's requirement in cooperation with a plurality of the controllers including the engine controller 20, generator controller 21, motor controller 22 and battery controller 23. Moreover, in view of both drivability (driving performance) and fuel consumption (fuel economy), the vehicle synthetic controller 24 controls the generation output.

Figure 2:
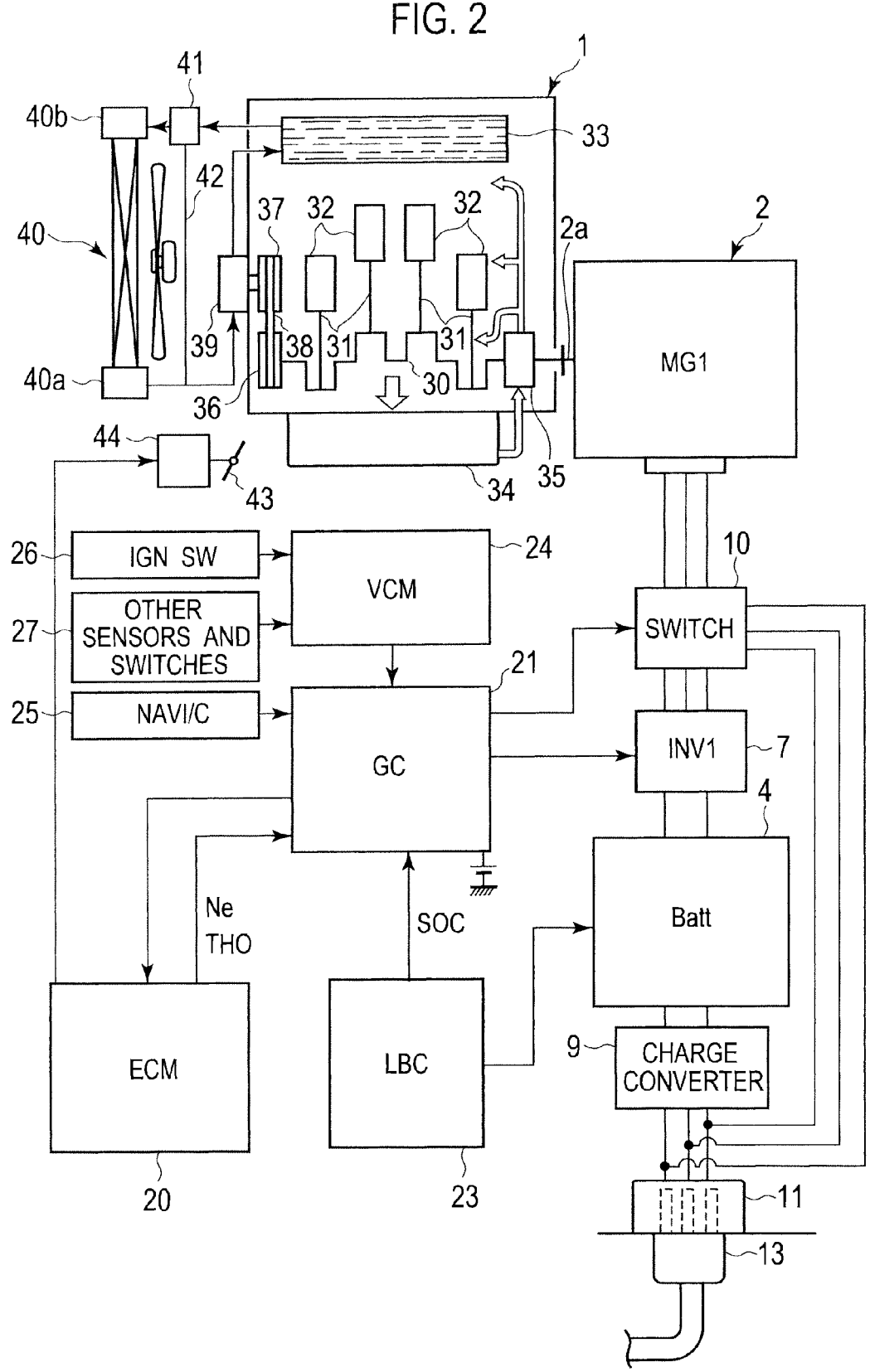
FIG. 2 is an entire system drawing showing a structure of a generation system of an engine lubrication control implemented according to the embodiment 1 of the present invention.

FIG. 2 is an entire system drawing showing a structure of a generation system of the engine lubrication control implemented according to the embodiment 1. Hereinafter, the structure of the generation system for implementing the engine lubrication control is to be set forth.

A hardware system of the generation system has, as shown in FIG. 2, the engine 1, the generation motor 2, the high power battery 4, the generation motor inverter 7, the charge converter 9, the switch 10, the charge port 11 and the power supply plug 13.

The engine 1 has a body which includes a crank shaft 30, a plurality of connecting rods 31, a plurality of pistons 32 and a coolant jacket 33. A lower portion of the body of the engine 1 has an oil pan 34. The crank shaft 30 is provided with i) an oil pump 35 driven by a rotation of the crank shaft 30 and ii) a water pump 39 driven by the rotation of the crank shaft 30 by way of a pair of pulleys 36, 37 and a belt 38.

After being driven according to the rotation of the crank shaft 30, the oil pump 35 pumps up a lubricant oil from the oil pan 34 and supplies the lubricant oil to lubrication requiring portions of the engine 1. Then, the lubricant oil after passing through the lubrication requiring portions of the engine 1 is returned to the oil pan 34, to thereby form an oil circulation path, as denoted by solid white arrows in FIG. 2. Herein, the "lubrication requiring portions" include a cam shaft bearing, a tappet, the piston 32, a crank shaft bearing and the like.

After being driven according to the rotation of the crank shaft 30, the water pump 39 pumps up an engine coolant from a lower tank 40*a* of a radiator 40 and then supplies the engine coolant to a coolant jacket 33, to thereby cool a cylinder head and the like. Then, the engine coolant having a high temperature is rendered to pass through a thermostat 41. Thereby, a part of the engine coolant is returned to an upper tank 40*b* of the radiator 40 while another part of the engine coolant is returned to a pump intake port by way of a bypass 42, to thereby form an engine coolant circulation circuit as denoted by black arrows in FIG. 2. In addition, in the engine lubrication control, the engine coolant having a low temperature is delivered from the water pump 39 to the coolant jacket 33, the thermostat 41 and the bypass 42, to thereby form the engine coolant circulation circuit which returns the low temperature engine coolant to the pump intake port.

The engine 1 is connected with a throttle valve 43 disposed at an intake passage, where the throttle valve 43 is as an electronically controlled throttle valve whose opening is controllable from an external portion. A throttle valve actuator 44 of the above electronically controlled throttle valve 43 is, as shown in FIG. 2, driveably controlled by an instruction from the engine controller 20.

The generation motor 2 has a motor shaft 2*a* which is directly connected to the crank shaft 30. Therefore, rotating the crank shaft 30 by means of the generation motor 2 causes the piston 32 of the engine 1 to make a reciprocating stroke and simultaneously causes the oil pump 35 and water pump 39 to make a pumping operation.

A software system of the generation system is, as shown in FIG. 2, provided with the engine controller 20, the generator controller 21, the battery controller 23, the vehicle synthetic controller 24 and a navigation controller 25.

The engine controller 20 supplies the engine speed (Ne) information, throttle opening (THO) information and oil level information to the generator controller 21 which implements the engine lubrication control. Then, in the engine lubrication control, after receiving the instruction from the generator controller 21, the engine controller 20 makes a throttle opening control of the throttle valve actuator 44 such that the throttle valve 43's throttle opening becomes a certain opening.

Figure 3:
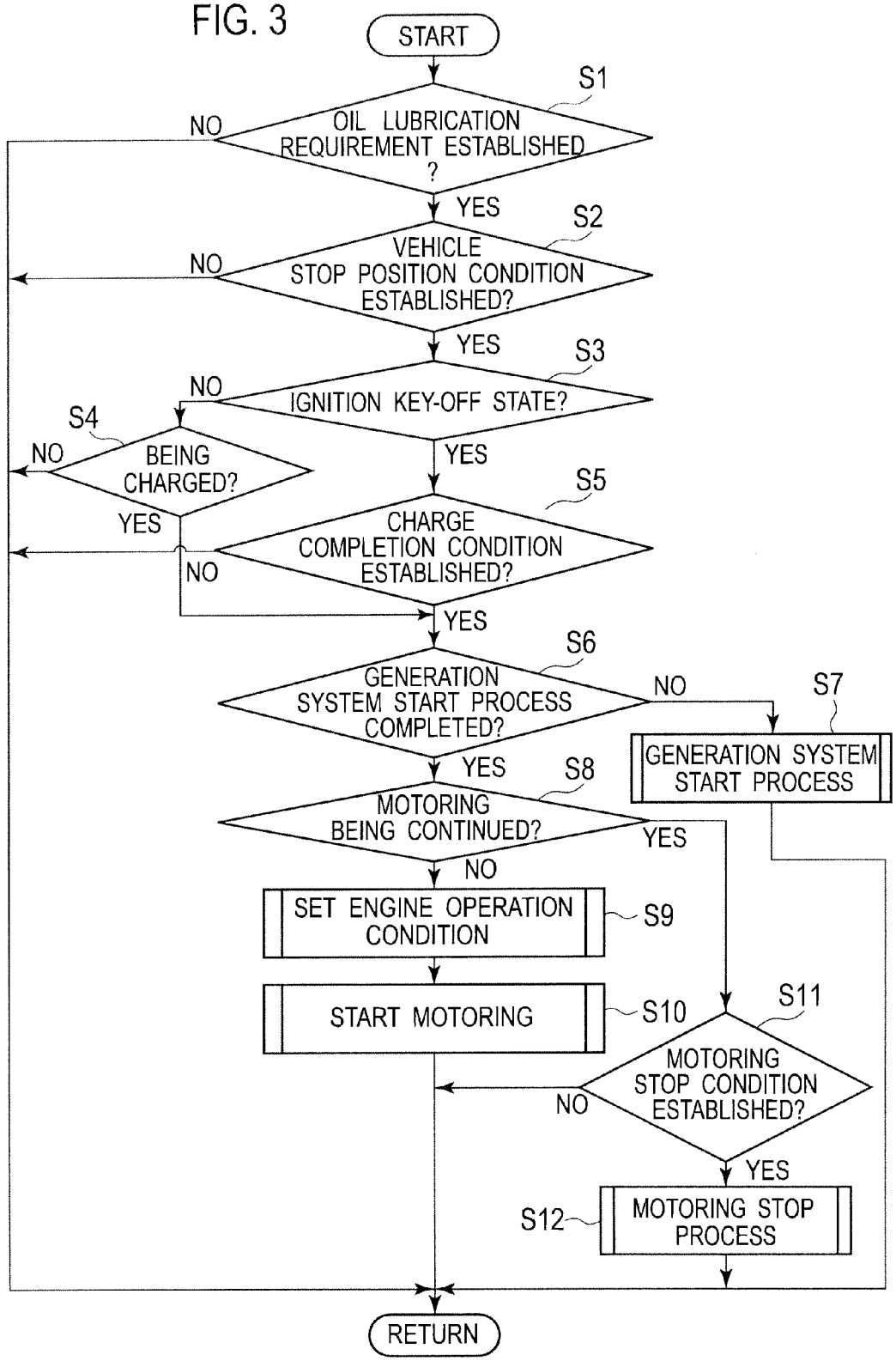
FIG. 3 is a flowchart showing a flow of the engine lubrication control implemented at a generator controller, according to the embodiment 1 of the present invention.

As shown in FIG. 3, from each of the engine controller 20, the battery controller 23, the vehicle synthetic controller 24 and the navigation controller 25, the generator controller 21 receives the engine speed (Ne) information, the throttle opening (THO) information, the oil level information, the battery SOC information, the key-on information, the key-off information, the vehicle stop position information and the like. Then, based on the thus inputted (received) pieces of information, the generator controller 21 determines the start condition and the like of the engine lubrication control. When a vehicle stop condition that the vehicle 50 stops at the set position of the external charger 12 for the purpose (intention) of the plug-in charge to the high power battery 4 is established in a state that the stop state of the engine 1 continues for more than or equal to a certain period (oil lubrication requirement established), the engine lubrication control is started. In other words, even when the oil lubrication requirement is established, the engine lubrication control start is prohibited in the period that the vehicle stop condition is not established. Then, when the vehicle stop condition shifts from an unestablished state to an established state, the start of the engine lubrication control is allowed.

The battery controller 23 supplies the battery SOC information to the generator controller 21 which implements the engine lubrication control.

The vehicle synthetic controller 24 receives information from an ignition key switch 26 and information from the other sensor and switch 27 (an accelerator opening sensor, a wheel speed sensor and the like) and supplies key-on information and key-off information to the generator controller 21 which implements the engine lubrication control.

By using a GPS signal from a satellite, the navigation controller 25 senses the own vehicle 50's position. Moreover, based on the map data memorized in a DVD and the like, the navigation controller 25 searches for a path to the destination and implements guidance. Then, together with home position information and charge station position information, the own vehicle 25's position information (on the map) obtained by the navigation controller 25 is supplied to the generator controller 21 which implements the engine lubrication control.

FIG. 3 is a flowchart showing a flow of the engine lubrication control process implemented by the generator controller 21 (engine lubrication controller) according to the embodiment 1. Hereinafter set forth is about each of the steps in FIG. 3. In addition, the flowchart is implemented in a certain calculation period, and an applied system is a system capable of implementing the plug-in charge regardless of whether the ignition key is off or on. In the flowchart, the engine lubrication control implemented by a cranking control (which sets a certain speed obtained by rotating the crank shaft 30) and a throttle control (which sets the throttle opening at the certain opening) is referred to as "motoring."

<Step S1>

At step S1, a routine determines whether or not the oil circulation requirement (engine unused period condition) that the stop condition of the engine 1 has continued for more than or equal to the certain period set as a determination threshold of an oil film cut is established. When YES at step S1 (oil circulation requirement established), the routine proceeds to step S2. When NO at step S1 (oil circulation requirement not established), the routine proceeds to RETURN.

<Step S2>

At step S2, following the determination at step 1 that the oil circulation requirement is established, based on the information from the navigation controller 25, the routine determines whether or not a vehicle stop position condition that the own vehicle 50's stop position matches with the set position of the external charger 12 is established.

When YES at step S2 (vehicle stop position condition established), the routine proceeds to step S3. When NO at step 2 (vehicle stop position condition not established), the routine proceeds to RETURN.

Herein, in the case that the own vehicle 50's stop position is determined to be the parking position for charging at home, a timer condition for determining whether or not the time is in a night time power period is also to be determined. In addition, the determination of the timer condition is not required when the own vehicle 50's stop position is determined to be the rapid charge station position disposed outside.

<Step 3>

At step S3, following the determination at step 2 that the vehicle stop position condition is established, the routine determines whether or not the ignition is turned off. When YES at step S3 (key-off state), the routine proceeds to step S5. When NO at step S3 (key-on state), the routine proceeds to step S4.

Herein, the "key-off state" is a state that the ignition key is removed or a state that the ignition is in the off position even when the ignition key is inserted. In the case of a push-start type ignition key, the "key-off state" includes a state that the push button is not pushed (pressed). In sum, the "key-off state" denotes that the system is in an off state, exhibiting a vehicle stop state that the passenger is away from the vehicle 50.

<Step 4>

At step S4, following the determination at step S3 that the ignition is in the key-on state, the routine determines whether or not the vehicle 50 is being in the process of the plug-in charge. When YES at step S4 (plug-in charge), the routine proceeds to step S6, When NO at step S4 (not plug-in charge), the routine proceeds to RETURN.

<Step 5>

At step S5, following the determination at step S3 that the vehicle 50 is in the key-off state, the routine determines whether or not an actual battery SOC (vSOC) is more than or equal to a set charge capacity mSOCFUL which is set as a plug-in charge completion threshold (vSOC≥mSOCFUL). When YES at step S5 (vSOC≥mSOCFUL), the routine proceeds to step S6. When NO at step S5 (vSOC<mSOCFUL), the routine proceeds to RETURN.

<Step 6>

At step S6, following the determination at step S4 that the vehicle 50 is being in the process of the plug-in charge or the determination at step S5 that vSOC≥mSOCFUL, the routine determines whether or not the generation system start process is completed. When YES at step S6 (generation system start process completed), the routine proceeds to step S8. When NO at step S6 (generation system start process not completed), the routine proceeds to step S7.

<Step S7>

At step S7, following the determination at step S6 that the generation system start process is not completed, the routine implements the generation system start process and then proceeds to RETURN.

Herein, the generation system start process is defined as to start the engine controller 20, the battery controller 23, the vehicle synthetic controller 24 and the navigation controller 25 which are necessary for implementing the engine lubrication control where the generation system start process is implemented by an instruction from the generator controller 21 which is started even in the system off state. That is, the generation system start process is to shift the generation system (which implements the engine lubrication control) from the system-off state to the system-on state.

<Step S8>

At step S8, following the determination at step S6 that the generation system start process is completed, the routine determines whether or not the motoring (that the engine speed is kept at the certain speed) is being continued. When YES at step S8 (motoring being continued), the routine proceeds to step S11. When NO at step S8 (motoring being started), the routine proceeds to step S9.

<Step S9>

At step S9, following the determination at step S8 that the motoring is being started, the routine sets an operation condition of the engine 1 and then proceeds to step S10.

Herein, the operation condition of the engine 1 is set in such a manner that the consumption power at the motoring is minimized and a combination (of the throttle opening and the engine speed) which does not cause vibration and noise is to be used.

Specifically, (a) Throttle opening and engine speed which decrease pump loss at the motoring.

(b) Engine speed out of a resonant point of the vehicle vibration.

(c) Throttle opening and engine speed which decrease an intake noise of the engine 1.

The throttle opening and the engine speed each simultaneously meeting the above paragraphs (a), (b) and (c) are respectively set as the certain opening and the certain speed.

<Step S10>

At step S10, following the setting of the operation condition of the engine 1 at step S9, the routine starts the motoring by the throttle control with respect to the throttle valve actuator 44 and by the cranking control with respect to the generation motor inverter 7 and switch 10, and then the routine proceeds to RETURN.

At the throttle control with respect to the throttle valve actuator 44, the routine so controls an actual throttle opening to the certain opening.

At the cranking control with respect to the generation motor inverter 7, the routine so controls an actual engine speed (=generation motor speed) to be increased up to the certain speed by a preset acceleration.

At the cranking control with respect to the switch 10; the routine selects the pattern which uses the power of the charge port 11 when implementing the motoring after the plug-in charge completion in the key-off state, while the routine selects the pattern which uses both the power of the charge port 11 and the power of the high power battery 4 when implementing the motoring during the plug-in charge in the key-on state.

<Step S11>

At step S11, following the determination at S8 that the motoring is being continued, the routine determines whether or not a motoring stop condition is established. When YES at step S11 (motoring stop condition established), the routine proceeds to step S12. When NO at step S11 (motoring stop condition not established), the routine proceeds to RETURN.

The motoring stop condition is an oil circulation stop condition which verifies that the lubricant oil supply to the lubrication requiring portion (sliding portions and rotating portions) of the engine 1 is completed.

Specifically, (a) When an engine speed sum from the motoring start is more than or equal to a preset certain mNESUM.

(b) When a torque of the generation motor 2 for driving the engine 1 is decreased by a certain torque relative to a torque at the motoring start.

(c) When the oil level of the oil pan 34 is decreased by a specified amount.

Establishment of any one of the paragraphs (a), (b) and (c) above establishes the motoring stop condition.

<Step S12>

At step S12, following the determination at step S11 that the motoring stop condition is established, the routing implements a motoring stop process and then proceeds to RETURN, to thereby end the engine lubrication control. At the motoring stop process (S12) after the motoring stop condition is established (S11), the routine implements such an engine speed control that the actual engine speed (=generation motor speed) by a set engine speed is decreased to 0 (stop) at a preset deceleration. Then, when the routine determines that the engine 1 is stopped (engine stop), the routine returns the throttle opening to an original throttle opening. Moreover, the routine clears the oil lubrication condition, and renders the generation system in the system-off state.

Then, operations of the present invention are to be set forth.

At first, "subject of plug-in hybrid vehicle" is to be set forth. Then, the operations of the control system 100 of the plug-in hybrid vehicle 50 according to the embodiment 1 are to be divided into "engine lubrication control process operation," "engine lubrication control operation," "determining operation of engine lubrication control start condition" and "control operation after engine lubrication control start."

[Subject of Plug-In Hybrid Vehicle]

The series type plug-in hybrid vehicle like the one according to the embodiment 1 is based on an electric vehicle (EV) having a small generator and a large battery capacity and has an extended travel distance per charge. That is, with the generation motor's output lower than the drive motor's output, the above plug-in hybrid vehicle (50) secures a travel distance by the plug-in charge, in addition, only when a battery charge is required, the plug-in hybrid vehicle (50) implements the generation by means of the engine at a high efficiency. This makes it possible that without the need of a fuel (engine), the plug-in hybrid vehicle can make a round trip only with an inexpensive night-time power for daily use such as short-travel commutation, shopping, pickup service and the like. Moreover, the electric vehicle's shortcomings (travel distance and charge time) can be overcome and a good response starting performance or acceleration performance by an electric motor drive can be fully derived.

Therefore, in the case of the plug-in hybrid vehicle especially using an external power source, for example, when the use of the EV travel only is long due to repeated commutations and the like which are short in travel distance, the period of the engine stop state is necessarily long. With this, the lubricant oil {which has i) a lubricating function of the sliding parts in the engine, ii) an antirust function of a metal surface in the engine, iii) and the like} outflows from the lubrication requiring portion of the engine and thereby may decrease or may be extinct, thus causing an oil film cut. As a result, in the case of a long-distance travel after a long-term EV travel, implementing the generation by the engine which has caused the oil film cut due to the lubricant oil shortage may cause a seizure of the sliding parts at the engine start or may lower the generation efficiency. Moreover, a rusting in the engine may further deteriorate the engine, which may lower durability reliability.

As a countermeasure to the above subject, Japanese Patent Application Laid-Open No. 2007-216764 proposes a technology where, when the oil lubrication requirement that the engine stop state has continued for more than or equal to the certain period is established in the ignition key-on state, cranking of the engine is implemented by the motor and the pump is driven, to thereby implement the engine lubrication control. According to the above proposed technology, absence of the ignition start of the engine suppresses fuel consumption while making it possible to prevent rust in the engine or prevent the sliding part seizure at the engine start.

However, at the travel mode in the key-on state, the engine lubrication control causes a power consumption attributable to the motor and the battery capacity is deceased in the travel by an amount equivalent to the power consumption. As a result, at the system start shifting from the key-off state to the key-on state, that is, at a time point of initially riding on the vehicle, the EV travel distance recognized by the battery remaining capacity is shortened by the engine lubrication control which has nothing to do with the travel. With this, as the case may be, a schedule that would have accomplished the EV travel to the destination fails to travel (EV travel) to the destination due to the motor power consumption by the engine lubrication control, thus discomforting the driver.

[Engine Lubrication Control Process Operation]

Hereinafter, based on the flowchart in FIG. 3, the engine lubrication control process operation is to be set forth.

When the continuation period of the stop state the engine 1 is less than the certain period, the oil circulation requirement is not established, thereby repeating the flow from step S1 to RETURN in the flowchart in FIG. 3.

Then, such operations as repeating the EV travel which does not use the engine 1, leaving the vehicle 50 on a parking area for a long time, and the like renders the continuation period of the stop state of the engine 1 more than or equal to the certain period, thus establishing the oil circulation requirement. However, when the vehicle travels or stops in the position out of the set position of the external charger 12 and therefore the vehicle stop position condition is not established, the flow from step S1 to step S2 to RETURN in the flowchart in FIG. 3 is repeated.

Then, after the oil circulation requirement is established, the vehicle 50 stops in the set position of the external charger 12, to thereby start the plug-in charge in the key-off state. During the period that a charge completion condition at step S5 is not established in this plug-in charge, the routine repeats the flow from step S1 to step S2 to step S3 to step S5 to RETURN in the flowchart in FIG. 3. Meanwhile, during the period that the charge completion condition at step S5 is established in this plug-in charge, the routine proceeds from step S1 to step S2 to step S3 to step S5 to step S6 to step S7 to RETURN in the flowchart in FIG. 3. With the above flow, at step S7, a generation system start process is implemented. In the next control process, the routine proceeds from step S1 to step S2 to step S3 to step S5 to step S6 to step S8 to step S9 to step S10 to RETURN in the flowchart in FIG. 3, since the generation system start process has been completed.

Moreover, when the vehicle 50 stops at the set position of the external charger 12 and starts the plug-in charge in the key-on state, such key-on state has already completed the generation system start process. With this, the routine proceeds from step S1 to step S2 to step S3 to step S4 to step S6 to step S8 to step S9 to step S10 to RETURN in the flowchart in FIG. 3.

As set forth above, in the case of the key-off charge, when the engine lubrication control start condition is established, the routine proceeds from step S1 to step S2 to step S3 to step S5 to step S6, thus starting the engine lubrication control. Meanwhile, in the case of the key-on charge, when the engine lubrication control start condition is established, the routine proceeds from step S1 to step S2 to step S3 to step S4 to step S6, thus starting the engine lubrication control. Then, a motoring start control by the two flows, that is, the key-off charge and the key-on charge is repeated until the engine speed reaches the certain speed and the motoring continuation is determined at step S8. In the motoring start control, the engine operation condition is set at step S9, and then the engine speed is increased to the certain speed and the throttle opening is set at the certain opening at step S10.

Then, when the engine speed reaches the certain speed and the motoring continuation is determined at step S8 (YES at S8), the flow proceeding from step S8 to step S11 to RETURN in the flowchart in FIG. 3 is repeated until the motoring stop condition at step S11 is established. During the above repeated flow, the cranking control for keeping the engine speed at the certain speed and the throttle control for keeping the throttle opening at the certain opening implement the motoring control.

Then, when the motoring stop requirement is established at step S11, the flow from step S11 to step S12 to RETURN in the flowchart in FIG. 3 is repeated until the motoring stop process at step S12 is completed, thus implementing a motoring completion control. In the motoring completion control, at step S12, the engine speed is deceased to zero. Then, when the engine 1 stops rotation, the following operations are implemented: the throttle opening is returned to an original opening, the engine stop continuation period of the oil circulation requirement is reset, the generation system is turned off, to thereby complete the motoring stop process, and the motoring control is ended.

[Engine Lubrication Control Operation]

Figure 4:
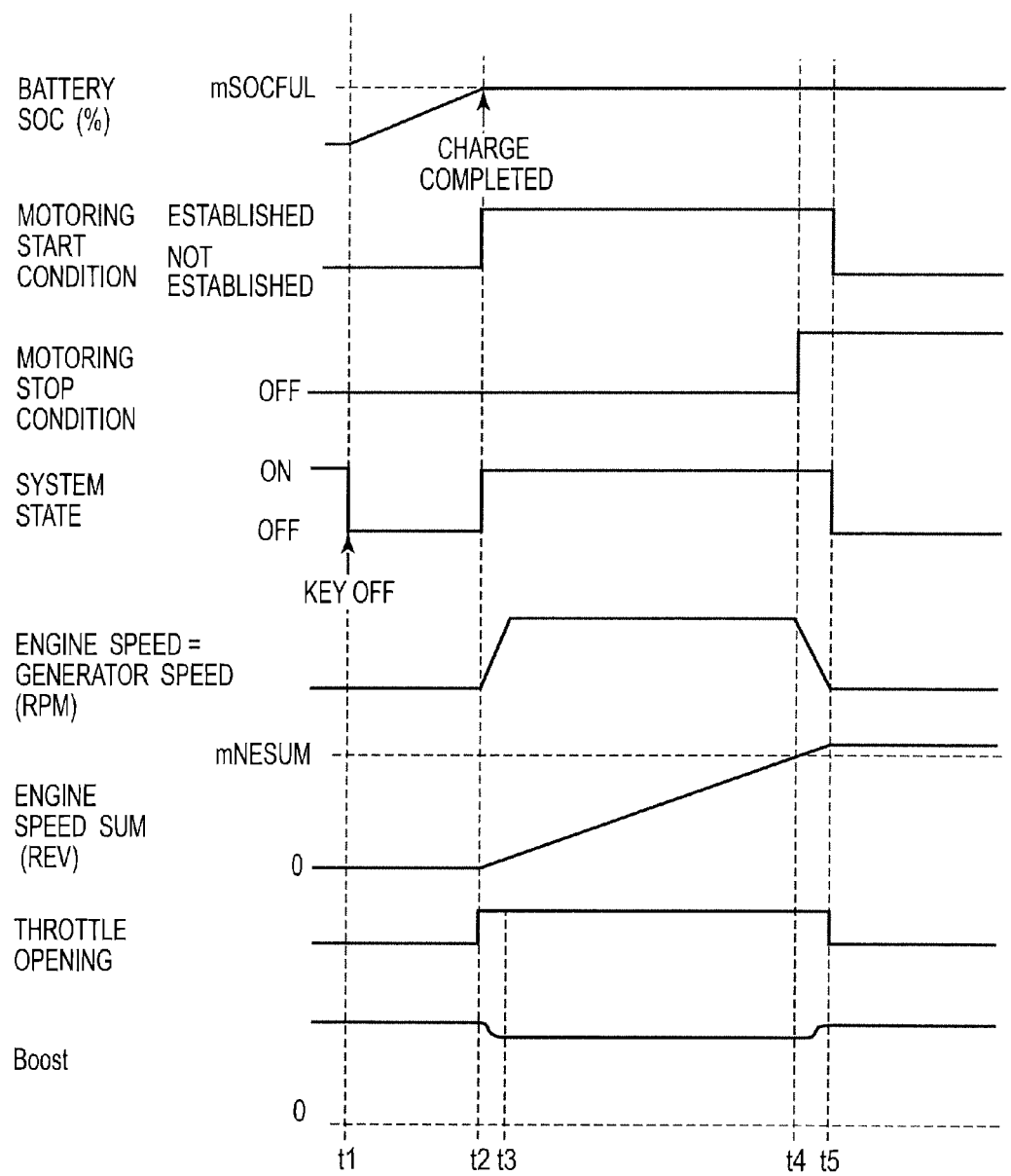
FIG. 4 is a timing chart showing various characteristics including battery SOC (State Of Charge), start condition, stop condition, system condition, engine speed (=generator speed), engine speed sum, throttle opening and boost pressure (intake pressure) in the engine lubrication control operations implemented by the generator controller, according to the embodiment 1 of the present invention.

Hereinafter, by using a timing flowchart in FIG. 4, a motoring control operation (=engine lubrication control operation) when implementing the plug-in charge in the key-off state is to be set forth. Herein, it is assumed that at a time point before entering a time t1 in FIG. 4, the oil lubrication requirement and vehicle stop position condition have been established.

The ignition key is operated from the key-on state to the key-off state at the time t1 and the plug-in charge is started in the key-off state, to thereby monitor a charge progress status in view of change of the battery SOC. Then, as shown by a battery SOC characteristic, the actual battery SOC (vSOC) increases according to an elapse of time to reach the set charge capacity mSOSFFUL, to thereby determine that the charge is completed (charge completion).

When the charge completion determines that the charge completion condition is established at time t2, the motoring start condition is changed from "not established" to "established" at time t2, and then the system condition is changed from OFF to ON by means of the generation system start process, to thereby implement the motoring start control. In this motoring start control, as shown in an engine speed characteristic, from the time t2, the cranking by the generator motor 2 starts increasing the engine speed and then allows the engine speed to reach the certain speed at time t3. Moreover, as shown in a throttle opening characteristic, the throttle opening is opened to the certain opening at the time t2. Meanwhile, as shown in a boost pressure characteristic, the intake pressure is decreased after the throttle opening is opened to the certain opening.

From the time t3 for completing the motoring start control to a time 4 at which the motoring stop condition is established, the motoring control is being implemented. When the motoring control is being implemented, as shown in the engine speed characteristic and throttle opening characteristic, the engine speed is kept at the certain speed and the throttle opening is kept at the certain opening. Herein, the motoring stop condition is determined to be established when the engine speed from the time t2 is added and then the engine speed sum is more than or equal to the preset certain value mNESUM at time t4, as shown in an engine speed sum characteristic. At the time t4 at which the motoring stop condition is established, the motoring stop condition is switched from OFF to ON, as shown by a motoring stop condition characteristic.

During the motoring control, as shown in FIG. 2, the generator motor 2 is caused to rotate by using the power from the charge port 11. In this way, since the power from the charge port 11 is used, the battery SOC is kept at a full charge state during the motoring control, as shown in the battery SOC characteristic. Then, when the generator motor 2 rotates, the crank shaft 30 connected to the generator motor 2 rotates and simultaneously the oil pump 35 and water pump 39 which are rotated by the crank shaft 30 rotate.

When the crank shaft 30 rotates, the piston 32 makes the reciprocating stroke according to the rotation of the crank shaft 30, thus sucking an air from the intake passage and discharging the thus sucked air from a discharge passage. Then, the throttle valve is opened and is kept at the certain opening, to thereby suppress an intake air resistance which is caused when the piston 32 makes the reciprocating stroke. That is, a load applied to the generator motor 2 which rotates the crank shaft 30 is also suppressed low.

When the oil pump 35 is driven, the lubricant oil is pumped up from the oil pan 34, to thereby supply the lubricant oil to the lubrication requiring portions of the engine 1 and then the lubricant oil passing through the lubrication requiring portions is returned to the oil pan 34. With the above oil circulation, the lubrication requiring portions (that is, the camshaft bearing, the tappet, the piston 32, the crankshaft bearing and the like) are lubricated.

When the water pump 39 is driven, the engine coolant sucked from the pump intake port is returned to the pump intake port by way of the coolant jacket 33, the thermostat 41 and the bypass 42. The above engine coolant circulation causes a flow to the engine coolant which was staying in the coolant jacket 33 and the like.

From the time t4 at which the motoring stop condition is established to the time t5 at which the engine speed is zero, the motoring completion control is implemented. In this motoring completion control, as shown in the engine speed characteristic, from the time t4, the cranking by the generator motor 2 starts decreasing the engine speed and then the engine speed reaches zero at the time t5. Moreover, as shown in the throttle opening characteristic, from the certain opening, the throttle opening is returned to its original opening at time t5. With this, as shown in the boost pressure characteristic, closing the throttle opening to its original opening returns the deceased intake pressure to its original pressure.

As set forth above, after the oil lubrication requirement that the stop state of the engine 1 has continued for more than or equal to the certain period is established, whether or not the vehicle stop condition (that is, the vehicle 50 is stopped in the set position of the external charger 12 for the purpose (intention) of the plug-in charge to the high power battery 4) is established is determined. Then, during the period that the vehicle stop condition is not established, the start of the motoring control is prohibited. Then, when the vehicle stop condition is shifted from "not established" to "established," the start of the motoring control is allowed.

That is, as a condition for implementing the motoring control by the pump (oil pump 35) driving and engine revolution, the vehicle stop condition that the vehicle 50 is stopped in the set position of the external charger 12 for the purpose (intention) of the plug-in charge to the high power battery 4 is added. With this, the power consumption by the generator motor 2 is caused when the driver has no intention of travel, that is, i) during the vehicle stop during the plug-in charge or ii) during the vehicle stop after the plug-in charge completion. In other words, the power consumption by the motoring control is not caused during the travel.

Therefore, the EV travel distance recognized by the remaining capacity of the high power battery 4 at the time point of initially riding on the vehicle 50 can be prevented from being shortened by the motoring control for the engine lubrication which has nothing to do with the travel. With this, when the remaining capacity of the high power battery 4 at the time point of initially riding on the vehicle 50 makes the schedule that the EV travel to the destination is accomplished, such EV travel is secured to the destination unless an unexpected power consumption is caused during the EV travel.

[Determining Operation of Engine Lubrication Control Start Condition]

The engine lubrication control start condition starts the engine lubrication control when the vehicle stop condition that the vehicle 50 stops in the set position of the external charger 12 for the purpose (intention) of the plug-in charge to the high power battery 4 is established (step S2 to step S5) in the state that the oil circulation requirement that the stop state of the engine 1 has continued for more than or equal to the certain period is established (YES at step S1). That is, when stopping the vehicle 50 at home or a place away from home for the plug-in charge, the driver does not have an intention of travel, in addition, generally the driver (passenger) is away from the vehicle 50 until the time at which the plug-in charge is completed elapses.

Therefore, when it is determined that the vehicle stop is for the plug-in charge purpose (intention), starting the engine lubrication control uses the period of stopping the vehicle 50 for the plug-in charge, thereby, the engine lubrication control can be automatically started without being noticed by the passenger.

According to the embodiment 1, the determination of the vehicle stop condition establishment is implemented when the following conditions are established: the vehicle stop position condition that the vehicle stop position matches with the set position of the external charger 12 (YES at step S2), the key-off condition that the ignition key is off (YES at step S3), and the charge completion condition that the plug-in charge to the high power battery 4 is completed (YES at step 5).

That is, when the plug-in charge is implemented in the key-off state, the time required until the charge of the power necessary for the travel is completed can be shortened by completing the plug-in change prior to the engine lubrication control. Therefore, when the plug-in charge is implemented in the key-off state, adding the charge completion condition that the plug-in charge to the high power battery 4 is completed (YES at step 5) can start the engine lubrication control in such a manner that the charge completion is prioritized and the time required until the charge completion is shortened.

According to the embodiment 1, the determination of the vehicle stop condition establishment is implemented when the following conditions are established: the vehicle stop position condition that the vehicle stop position matches with the set position of the external charger 12 (YES at step S2), the key-on condition that the ignition key is on (NO at step S3), and the charge condition that the plug-in charge to the high power battery 4 is being implemented (YES at step S4).

That is, ordinarily, although the plug-in charge is implemented in the key-off state, the system which allows the plug-in charge in the key-on state is also shown in the embodiment 1. Thus, when the control is started by the determination of only "in the key-off state," the system capable of implementing the plug-in charge in the key-on state determines that the vehicle stop condition by the charge is not established, thus failing to start the engine lubrication control.

Therefore, when the plug-in charge is implemented in the key-on state, adding the "charge being implemented" condition complies with the system capable of implementing the plug-in charge in the key-on state, thus making it possible to start the engine lubrication control.

[Control Operation After Engine Lubrication Control Start]

According to the embodiment 1, when the plug-in charge is implemented in the key-off state, the engine lubrication control after the plug-in charge completion is implemented by using the power from the charge port 11.

That is, in the plug-in charge in the key-off state, starting the engine lubrication control by prioritizing the charge completion can shorten the time for completing the charge of the power necessary for the travel.

Moreover, with the engine lubrication control, the power from the charge port 11 (power from an external power source) is used to rotate the generator motor 2. In other words, the electricity can be efficiently used by an amount equivalent to an omission of inputting the power to the high power battery 4 and outputting the power from the high power battery 4.

According to the embodiment 1, when the plug-in charge is implemented in the key-on state, the engine lubrication control during the plug-in charge is implemented by using both the power of the charge port 11 and the power of the high power battery 4.

With this, even when the charge is completed in the engine lubrication control and the power supply plug 13 is removed from the charge port 11 the power of the high power battery 4 can continue the engine lubrication control.

According to the embodiment 1, the throttle opening and engine speed which determine the operation condition of the engine 1 in the control are respectively set to the certain opening and certain speed. Moreover, according to the embodiment 1, the cranking control which allows the generator motor 2 to rotate the crank shaft 30 to thereby accomplish the certain speed and the throttle control which allows the instruction to the throttle valve actuator 44 to accomplish the certain opening, to thereby implement the engine lubrication control.

That is, with respect to the engine lubrication control, the speed of the engine 1 is a factor which influences a pump loss, a vibration or a noise while the throttle opening of the engine 1 is a factor which influences the pump loss or the intake noise of the engine 1.

Therefore, setting up the throttle opening and engine speed that decrease the pump loss of the oil pump 35 can minimize the consumption power in the engine lubrication control. Moreover, setting up the engine speed which is deviated from a resonant point of the vehicle vibration can suppress the vibration which may be caused in the engine lubrication control. Still furthermore, setting up the throttle opening and engine speed that decrease the intake noise of the engine 1 can suppress the noise which may be caused in the engine lubrication control.

According to the embodiment 1, in the engine lubrication control, the routine determines the oil circulation stop condition (motoring stop condition) for verifying that the lubricant oil supply to the lubrication requiring portion of the engine 1 is completed. When the oil circulation stop condition is established (YES at step S11), the routine ends the engine lubrication control (step S12).

For example, the determination of what degree of the engine speed sum completes the lubricant oil supply to the lubrication requiring portion of the engine 1 can be obtained by experimental data. Therefore, the engine speed sum obtained by the experimental data is set as the certain value mNESUM. Then, in the case that the engine speed sum from the start of the engine lubrication control is more than or equal to the certain value mNESUM, it can be verified that the lubricant oil supply to the lubrication requiring portion of the engine 1 is completed.

Moreover, for example, to what degree the torque of the generator motor 2 for rotating the engine 1 is decreased from the start of the engine lubrication control to the completion of the lubricant oil supply to the lubrication requiring portion of the engine 1 can be obtained by the experimental data. Then, the value obtained by the experimental data is set as the certain torque. In this case, when the decreased torque from the start of the engine lubrication control reaches the certain torque, it can be verified that the lubricant oil supply to the lubrication requiring portion of the engine 1 is completed.

Moreover, for example, to what degree the oil level in the oil pan 34 is decreased from the start of the engine lubrication control to the completion of the lubricant oil supply to the lubrication requiring portion of the engine 1 is obtained by the experimental data. Therefore, the value obtained by the experimental data is set as a specified quantity of the oil level. In this case, when the oil level in the oil pan 34 is decreased by the specified quantity, it can be verified that the lubricant oil supply to the lubrication requiring portion of the engine 1 is completed.

Then, effects of the present invention are to be set forth.

The control system 100 of the plug-in hybrid vehicle 50 according to the embodiment 1 brings about the following effects listed below.

(1) The control system 100 of the hybrid vehicle 50, comprises: the engine 1; the motor 2 capable of driving the engine 1; the oil pump 35 for supplying the lubricant oil to the lubrication requiring portion of the engine 1; and the engine lubrication controller (21, FIG. 3) configured to make the following operations in the case that the stop state of the engine 1 continues for more than or equal to the certain period (YES at S1): when the vehicle stop condition (S2-S5) that the driver has no intention of travel is established (S2-S5), supplying, by the oil pump 35, the lubricant oil to the lubrication requiring portion of the engine 1, and rotating the engine 1 by the motor 2 without igniting the engine 1, thereby implementing the engine lubrication control (S6-S12).

With this, the motor travel (EV travel) distance recognized at the time point of initially riding on the vehicle 50 can be prevented from being shortened due to the engine lubrication control which has nothing to do with the travel.

(2) The hybrid vehicle 50 is the plug-in hybrid vehicle 50 which: has the high power battery 4 and the charge port 11, stops in the set position of the external charger 12, allows the external charger 12 to be connected with the charge port 11, and allows the charge to the high power battery 4 by using the power from the external charger 12, and in the state that the oil circulation requirement that the stop state of the engine 1 continues for more than or equal to the certain period is established (YES at S1), the engine lubrication controller (21, FIG. 3) starts the engine lubrication control (S6-S12) when the vehicle stop condition (S2-S5) that the driver stops the hybrid vehicle 50 in the set position of the external charger 12 with the intention of the plug-in charge to the high power battery 4 is established.

With this, in addition to the effects set forth in paragraph (1), the following effect can be brought about: in the plug-in hybrid vehicle 50 having a high possibility or frequency that the engine stop state continues for more than or equal to the certain period, the engine lubrication control can be automatically started by using the period of stopping the vehicle for the plug-in charge without the operation by the passenger and without being noticed by the passenger.

(3) The engine lubrication controller (21, FIG. 3) implements the determination of the establishment of the vehicle stop condition (S2-S5) when: the vehicle stop position condition that the vehicle stop position matches with the set position of the external charger 12 is established (YES at S2), the key-off condition that the ignition key is off is established (YES at S3), and the charge completion condition that the plug-in charge to the high power battery 4 is completed is established (YES at S5).

With this, in addition to the effect set forth in the paragraph (2), the following effect can be brought about: when the plug-in charge is implemented in the key-off state, the engine lubrication control can be started in such a manner that the charge completion is prioritized and the time required until the charge completion is shortened.

(4) By using the power from the charge port 11, the engine lubrication controller (21, FIG. 3) implements the engine lubrication control (S10) after the plug-in charge is completed.

With this, in addition to the effect set forth in the paragraph (3), the following effect can be brought about: the time for completing the charge of the power necessary for the travel can be shortened and the electricity can be efficiently used by an amount equivalent to an omission of inputting the power to the high power battery 4 and outputting the power from the high power battery 4.

(5) The engine lubrication controller (21, FIG. 3) implements the determination of the establishment of the vehicle stop condition (S2-S5) when: the vehicle stop position condition that the vehicle stop position matches with the set position of the external charger 12 is established (YES at S2), the key-on condition that the ignition key is on is established (NO at S3), and the charge condition that the plug-in charge to the high power battery 4 is being implemented (YES at S4).

With this, in addition to the effect set forth in the paragraph (2), the following effect can be brought about: when the plug-in charge is implemented in the key-on state in compliance with the system capable of implementing the plug-in charge in the key-on state, the engine lubrication control can be started in the condition that the vehicle is being charged.

(6) By using both the power from the high power battery 4 and the power from the charge port 11, the engine lubrication controller (21, FIG. 3) implements the engine lubrication control (S10) in the plug-in charge.

With this, in addition to the effect set forth in the paragraph (5), the following effect can be brought about: even when the charge is completed in the engine lubrication control and the power supply plug 13 is removed from the charge port 11, the power of the high power battery 4 can continue the engine lubrication control.

(7) The oil pump 35 is rotated by the crank shaft 30 of the engine 1 rotated by the motor 2, the engine 1 has the throttle actuator 44 for controlling the angle of the throttle valve 43 of the intake passage, the controlling operation being implemented by the external instruction, and the engine lubrication controller (21, FIG. 3) implements the engine lubrication control (S6-S12) by the following controlling operations: the cranking control having the following sub-operations: setting the engine speed to the certain speed (S9), wherein the engine speed determines the operation condition of the engine 1 in the engine lubrication control (S6-S12), and obtaining the certain speed by allowing the motor 2 to rotate the crank shaft 30, and the throttle control having the following sub-operations: setting the throttle opening to the certain opening (S9), wherein the throttle opening determines the operation condition of the engine 1 in the engine lubrication control (S6-S12), and obtaining the certain opening by the instruction to the throttle actuator 44.

With this, in addition to the effects set forth in the paragraphs (1) to (6), the following effect can be brought about: setting up the throttle opening and engine speed that decrease the pump loss of the oil pump 35 can minimize the consumption power at the engine lubrication control. Moreover, setting up the engine speed which is deviated from the resonant point of the vehicle vibration can suppress the vibration which may be caused in the engine lubrication control. Still furthermore, setting up the throttle opening and engine speed that decrease the intake noise of the engine 1 can suppress the noise which may be caused in the engine lubrication control.

(8) In the engine lubrication control (S6-S12), the engine lubrication controller (21, FIG. 3) determines (S11) the oil circulation stop condition for verifying that the supplying of the lubricant oil to the lubrication requiring portion of the engine 1 is completed, and when the oil circulation stop condition is established (YES at S11), the engine lubrication controller (21, FIG. 3) ends the engine lubrication control (S12).

With this, in addition to the effects set forth in the paragraphs (1) to (7), the following effect can be brought about: the engine lubrication control can assuredly circulate the lubricant oil to the lubrication requiring portion of the engine 1.

Although the control system 100 of the hybrid vehicle 50 of the present invention has been set forth above based on the embodiment 1, the specific structure of the control system 100 is not limited to that according to the embodiment 1 and design change, addition or the like is allowed within the scope of the invention set forth in each of claims.

According to the embodiment 1, the vehicle stop condition includes the first example disclosing the plug-in charge completion (YES at step S5) in the key-off state (YES at step S3) and the second example disclosing that the plug-in charge is being implemented (YES at step S4) in the key-on state (NO at step S3). However, the present invention is not limited to the above. The vehicle stop condition may include the third example disclosing only the key-off state. Otherwise, the vehicle stop condition may include the fourth example disclosing the key-off state and that the plug-in charge is being implemented in the key-on state. In short, the vehicle stop condition may have variations provided that such vehicle stop condition can verify that the driver has no intention of making a travel.

The embodiment 1 shows the example disclosing that the engine lubrication control is started by the establishment of the vehicle stop condition after the charge completion and then the power of the charge port 11 is used.

The embodiment 1 also shows the other example disclosing that the engine lubrication control is started by the establishment of the vehicle stop condition during the plug-in charge and then both the power of the high power battery 4 and the power of the charge port 11 are used.

However, still another example disclosing that the establishment of the vehicle stop condition before the plug-in charge starts the engine lubrication control is allowed. In the still another example, the power of the high power battery 4 is to be used. With this, establishment of a charge capacity condition that the remaining capacity of the high power battery 4 can secure the motor consumption power can assuredly implement the engine lubrication control. Then, after the routine enters the charge; even if the charge is ended before reaching full-charge, it is possible to have ended the engine lubrication control.

The embodiment 1 shows the example disclosing that the oil pump 35 for making the pumping operation by the rotation of the crank shaft 30 of the engine 1. However, another example disclosing an oil pump which is driven by another electric motor is allowed. Moreover, still other example disclosing use of a mechanical pump together with an eclectic pump is allowed.

The embodiment 1 shows the example disclosing that the generator motor 2 connected to the engine 1 is used as a motor for rotating the engine 1 for lubrication. However, other than the motor for the generation, the motor for rotating the engine 1 for lubrication may be a lubrication-oriented motor for driving the vehicle or for starting the engine. In short, the motor for rotating the engine 1 for lubrication may be any motor provided that such motor can rotate the engine 1.

As the hybrid vehicle to which the control system 100 is applied, the embodiment 1 shows the example of the series type plug-in hybrid vehicle 50 where the engine 1 and the generator motor 2 are connected. However, the control system 100 may be applied to a parallel type plug-in hybrid vehicle where the engine and motor are connected via a clutch to thereby allow the motor to drive the engine.

Moreover, the control system 100 may be applied to a split type plug-in hybrid vehicle where the engine and motor are connected via a differential gear such as a planetary gear and the like to thereby allow the motor to drive the engine.

Still furthermore, the control system 100 may be applied to a hybrid vehicle which does not have a plug-in charge function. In this case, the oil lubrication requirement is caused to the engine mainly due to a long-term left-alone parking.

This application is based on a prior Japanese Patent Application No. 2010-041289 (filed Feb. 26, 2010 in Japan). The entire contents of the Japanese Patent Application No. 2010-041289 from which priority is claimed are incorporated herein by reference, in order to take some protection against translation errors or omitted portions.

The scope of the present invention is defined with reference to the following claims.

What is claimed is:

1. A control system of a hybrid vehicle, comprising:
an engine;
a motor capable of driving the engine;
an oil pump for supplying a lubricant oil to a lubrication requiring portion of the engine; and
an engine lubrication controller configured to make the following operations in a case that a stop state of the engine continues for more than or equal to a certain period:
when a vehicle stop condition that an ignition key is off is established,
supplying, by the oil pump, the lubricant oil to the lubrication requiring portion of the engine, and
rotating the engine by the motor without igniting the engine, thereby implementing an engine lubrication control.

2. The control system of the hybrid vehicle according to claim 1 wherein
the hybrid vehicle is a plug-in hybrid vehicle which:
has a high power battery and a charge port,
stops in a set position of an external charger,
allows the external charger to be connected with the charge port, and
allows a charge to the high power battery by using a power from the external charger, and
in a state that an oil circulation requirement that the stop state of the engine continues for more than or equal to the certain period is established, the engine lubrication controller starts the engine lubrication control when the vehicle stop condition that a driver stops the hybrid vehicle in the set position of the external charger with an intention of a plug-in charge to the high power battery is established.

3. The control system of the hybrid vehicle according to claim 2 wherein
the engine lubrication controller implements a determination of an establishment of the vehicle stop condition when:
a vehicle stop position condition that a vehicle stop position matches with the set position of the external charger is established, a key-off condition that an ignition key is off is established, and a charge completion condition that the plug-in charge to the high power battery is completed is established.

4. The control system of the hybrid vehicle according to claim 3 wherein by using the power from the charge port, the engine lubrication controller implements the engine lubrication control after the plug-in charge is completed.

5. The control system of the hybrid vehicle according to claim 1 wherein the oil pump is rotated by a crank shaft of the engine rotated by the motor, the engine has a throttle actuator for controlling an angle of a throttle valve of an intake passage, the controlling operation being implemented by an external instruction, and the engine lubrication controller implements the engine lubrication control by the following controlling operations:

a cranking control having the following sub-operations:
setting an engine speed to a certain speed, wherein the engine speed determines an operation condition of the engine in the engine lubrication control, and
obtaining the certain speed by allowing the motor to rotate the crank shaft, and a throttle control having the following sub-operations:
setting a throttle opening to a certain opening, wherein the throttle opening determines the operation condition of the engine in the engine lubrication control, and
obtaining the certain opening by the instruction to the throttle actuator.

6. The control system of the hybrid vehicle according to claim 1 wherein in the engine lubrication control, the engine lubrication controller determines an oil circulation stop condition for verifying that the supplying of the lubricant oil to the lubrication requiring portion of the engine is completed, and when the oil circulation stop condition is established, the engine lubrication controller ends the engine lubrication control.

7. A control system of a hybrid vehicle, comprising:
an engine;
a motor capable of driving the engine;
an oil pump for supplying a lubricant oil to a lubrication requiring portion of the engine; and
an engine lubrication controller configured to make the following operations in a case that a stop state of the engine continues for more than or equal to a certain period:
when a vehicle stop condition that an external charger charges the hybrid vehicle is established,
supplying, by the oil pump, the lubricant oil to the lubrication requiring portion of the engine, and
rotating the engine by the motor without igniting the engine, thereby implementing an engine lubrication control.

8. The control system of the hybrid vehicle according to claim 7 wherein the hybrid vehicle is a plug-in hybrid vehicle which:
has a high power battery and a charge port,
stops in a set position of an external charger,
allows the external charger to be connected with the charge port, and
allows a charge to the high power battery by using a power from the external charger, and in a state that an oil circulation requirement that the stop state of the engine continues for more than or equal to the certain period is established, the engine lubrication controller starts the engine lubrication control when the vehicle stop condition that a driver stops the hybrid vehicle in the set position of the external charger with an intention of a plug-in charge to the high power battery is established.

9. The control system of the hybrid vehicle according to claim 8 wherein the engine lubrication controller implements a determination of an establishment of the vehicle stop condition when:
a vehicle stop position condition that a vehicle stop position matches with the set position of the external charger is established,
a key-on condition that an ignition key is on is established, and
a charge condition that the plug-in charge to the high power battery is being implemented.

10. The control system of the hybrid vehicle according to claim 9 wherein by using both a power from the high power battery and the power from the charge port, the engine lubrication controller implements the engine lubrication control in the plug-in charge.

11. The control system of the hybrid vehicle according to claim 7 wherein the oil pump is rotated by a crank shaft of the engine rotated by the motor, the engine has a throttle actuator for controlling an angle of a throttle valve of an intake passage, the controlling operation being implemented by an external instruction, and the engine lubrication controller implements the engine lubrication control by the following controlling operations:

a cranking control having the following sub-operations:
setting an engine speed to a certain speed, wherein the engine speed determines an operation condition of the engine in the engine lubrication control, and
obtaining the certain speed by allowing the motor to rotate the crank shaft, and a throttle control having the following sub-operations:
setting a throttle opening to a certain opening, wherein the throttle opening determines the operation condition of the engine in the engine lubrication control, and
obtaining the certain opening by the instruction to the throttle actuator.

12. The control system of the hybrid vehicle according to claim 7 wherein in the engine lubrication control, the engine lubrication controller determines an oil circulation stop condition for verifying that the supplying of the lubricant oil to the lubrication requiring portion of the engine is completed, and when the oil circulation stop condition is established, the engine lubrication controller ends the engine lubrication control.

13. A control method of a hybrid vehicle, comprising:
driving an engine by using a motor;
supplying a lubricant oil to a lubrication requiring portion of the engine; and making the following controlling operations by using a controller, in a case that a stop state of the engine continues for more than or equal to a certain period:
when a vehicle stop condition that a driver has no intention of travel is established,
supplying the lubricant oil to the lubrication requiring portion of the engine, and
rotating the engine by driving the engine without igniting the engine, thereby implementing an engine lubrication control.

* * * * *

UNITED STATES PATENT AND TRADEMARK OFFICE
CERTIFICATE OF CORRECTION

| | | |
|---|---|---|
| PATENT NO. | : 8,606,446 B2 | Page 1 of 1 |
| APPLICATION NO. | : 13/034072 | |
| DATED | : December 10, 2013 | |
| INVENTOR(S) | : Takao Ito et al. | |

It is certified that error appears in the above-identified patent and that said Letters Patent is hereby corrected as shown below:

On the title page, the last inventor's name should be included as follows:

item (75)   Inventors: -- Hiroyuki Suzuki, Sagamihara (JP) --

Signed and Sealed this
Fifth Day of August, 2014

Michelle K. Lee
*Deputy Director of the United States Patent and Trademark Office*